US006004249A

United States Patent [19]

Blais

[11] Patent Number: 6,004,249

[45] Date of Patent: Dec. 21, 1999

[54] SLIDE DISC SEAL ARRANGEMENT FOR A ROLL OF A PAPER MAKING OR FINISHING MACHINE OR THE LIKE

[75] Inventor: James Blais, Jyväskylä , Finland

[73] Assignee: Valmet Corporation, Jyväskylä , Finland

[21] Appl. No.: 09/114,311

[22] Filed: Jul. 13, 1998

[51] Int. Cl.[6] .......... B31F 1/00

[52] U.S. Cl. .......... 492/20; 100/162 B; 492/47; 277/558; 277/577; 277/581

[58] Field of Search .......... 492/47, 16, 17, 492/20; 100/162 B; 162/358.1, 358.3, 289; 277/551, 558, 572, 577, 581, 580

[56] References Cited

U.S. PATENT DOCUMENTS

| | | | |
|---|---|---|---|
| 3,565,445 | 2/1971 | Hodges | 277/577 |
| 4,226,428 | 10/1980 | Paptzum | 277/558 |
| 4,709,629 | 12/1987 | Appenzeller et al. | 100/162 B |
| 4,757,584 | 7/1988 | Pav et al. | 492/20 |
| 4,943,068 | 7/1990 | Hatch et al. | 277/577 |
| 5,119,542 | 6/1992 | Kusters et al. | 492/6 |
| 5,342,277 | 8/1994 | Steiner et al. | 492/56 |
| 5,769,771 | 6/1998 | Haag | 492/50 |

*Primary Examiner*—S. Thomas Hughes
*Assistant Examiner*—Marc W. Butler
*Attorney, Agent, or Firm*—Cohen, Pontani, Lieberman & Pavane

[57] ABSTRACT

A slide disc seal for use in a roll of a paper or board making machine or finishing apparatus, which roll comprises a stationary axle (1) and a rotatable shell (2) with an end element (8) at each end and bearing elements (3) at each end of the roll. The slide disc seal comprises a circular sliding surface (10) on the end element (8), a chamber (18) on the other of the components (1) placed axially on the area of the sliding surface (10) and extending radially in relation to the sliding surface (10), and a ring-shaped sliding seal disc (15) having an inner edge, an outer edge and a lip seal (16) on one of the edges, the seal disc (15) being slidingly fitted within the chamber (18) so that the edge having the lip seal (16) is against the sliding surface (10) and the other edge of the seal disc (15) is within the chamber (18).

16 Claims, 2 Drawing Sheets

SLIDE DISC SEAL ARRANGEMENT FOR A ROLL OF A PAPER MAKING OR FINISHING MACHINE OR THE LIKE

FIELD OF THE INVENTION

The present invention relates to sealing of a gap between an axle and a shell of a roll used in manufacturing of paper and paper board or in coating and processing the same.

BACKGROUND OF THE INVENTION

Several types of rolls are needed in paper making industry and oftentimes heavy loads are applied on the rolls. The load on the elements changes for several reasons and pulsates because of the rotation of the element. This causes displacements between the roll and the elements carrying the roll, and in some cases there is even need to move the axle of the roll in relation to the housing of the bearing element or an other frame element carrying the roll. If roller or ball bearings are used, the the sealing requirements are not as high as those of the seals of the slide bearings since the oil flow and pressure is less than in roller and ball bearings. In pressurized slide bearings, pressurized oil is pumped between the sliding surfaces, and the oil flows are notable. The pressure of the oil is normally low outside the bearing, but may in some cases exceed the normally used oil pressure in a lubrication oil circulation.

At present, most dynamic seals available allow some movement in radial or axial direction, but few designs allow combination of both movements at the same time, and the movements are usually limited to a few millimeters. However, in highly loaded rolls, the axles of the rolls bend during operation, and both radial and axial displacement occurs due to the angular displacement of the ends of the roll. Radial and axial displacement may occur also for different operational reasons, for example in some novel designs the position of the slide bearing within the bearing box may be changed to control a nip or gap formed by two adjacent rolls. When the position of the axle of the roll changes, its position in the bearing box changes, thereby causing the clearance between the axle and its seat in the bearing box to change. Presently available seals cannot accommodate such changes if displacements are large.

One known sealing structure for sealing the ends of rolls having a rotating shell mounted on slide bearings comprises a slide ring seal that is pressed against the end wall of the end plate of the roll shell by a spring loaded piston. The sealing structure also comprises a ring-formed conventional lip seal mounted on the end wall of the roll shell, and a backing ring. The backing ring forms a sliding surface for the rotating lip seal, and the ring is attached to the sliding ring seal, whereby the piston of the ring seal presses the backing ring against the lip seal and contact between the lip seal and the backing ring is maintained. The sealing contact is maintained during the radial movement between the roll shell and the roll axle by a wide sliding surface of the backing ring. This arrangement provides a reasonably wide radial movement area over which a good seal is maintained. However, the axial movement area is only a few millimeters and is determined by the movement range of the piston loaded ring seal. The ring seal has to be very precisely set against its sliding surface on the end plate of the roll shell. Therefore, the movement of the ring seal is limited. Especially angular movements of the roll axle are problematic to the ring seal and the lip seal that are attached together in the above described manner, since if the angle of the end plate changes in relation to the ring seal the backing ring attached to the ring seal may detach from the lip seal. Angular displacement may even cause the ring seal to loose its sealing contact.

As described above presently available seal constructions do not allow simultaneous relative movement in an axial and radial direction of two rotating components. However, in modern paper making machines such movents do occur in several elements, for example in rolls of film transfer coaters.

SUMMARY OF THE INVENTION

The object of the present invention is to provide a sealing structure for two elements allowing a relative movement of the elements simultaneously in both the axial and radial direction.

A ring-shaped circular disc having an inner and an outer edge and a lip seal arranged on one edge thereof is mounted around an inner component and the circular disc is fitted into a chamber formed on one of the components. The edge of the circular disc has a lip seal to sealingly contact a surface of one of the components. The chamber is formed in the other of the components.

According to the other aspects of the present invention, the circular disc can be arranged on a chamber formed in the inner or outer component. If desired, the disc may be locked in the chamber with suitable locking means such as a pin fit into a slot. The seal structure comprising a simple circular disc with a lip seal and a simple chamber for the disc is very easy to construct and assemble. The components needed are inexpensive and can be easily manufactured of inexpensive materials. Also the maintenance of the structure is easy. The present invention provides a structure that has practically no limits of displacement. Since the contact area of a lip seal on a surface of an machine element is narrow, it can accommodate deflections and angular displacements. For example, if the lip seal is arranged on an axle, the contact area of the lip seal on the axle is so narrow that an angular displacement of the axle through the contact area of the lip seal can be neglected.

The seal structure according to the present invention can be used for sealing gaps between any machine elements having at least one circular surface on which a lip seal can be pressed. The contact surface of the lip seal can be on either of the elements. The chamber of the circular disc may be arranged on either of the elements and the element carrying the chamber may have any desired form, for example, the chamber can be mounted on an axle having a polygonal cross section.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
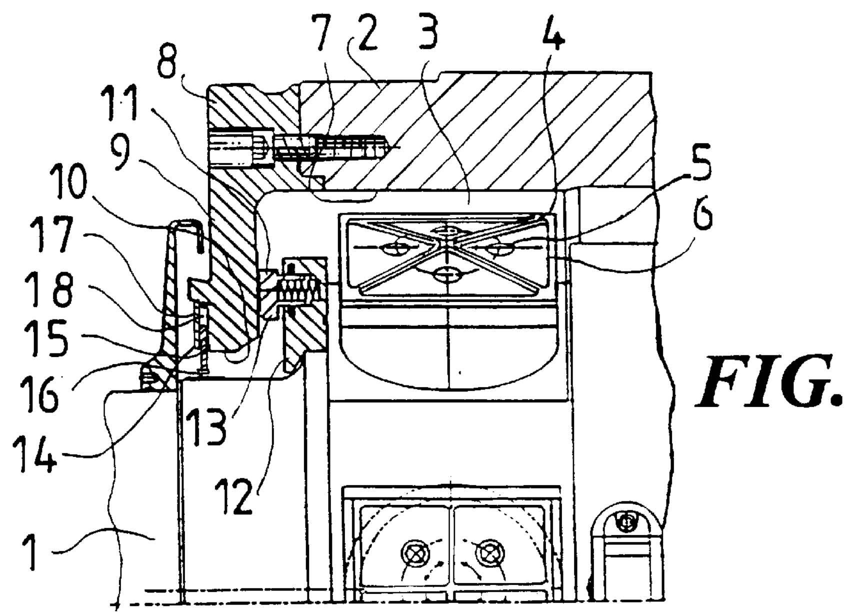
FIG. 1 shows a sectional view of one embodiment of the present invention.
Figure 2:
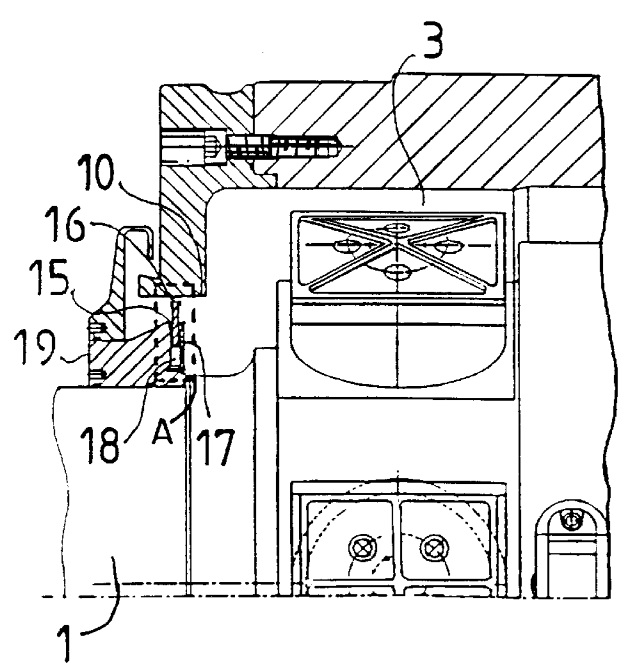
FIG. 2 shows a sectional view of another embodiment of the present invention.

FIGS. 1 and 2 show the end of a roll of a film transfer coater. The roll comprises a stationary supporting axle 1 and a rotatable shell 2 mounted on the axle 1. The shell 1 is fitted on the axle by slide bearings 3 at each end of the roll. For simplicity, only one end of the shaft is shown. The slide bearings 3 comprise a sliding surface 6 having oil channels 4 and oil grooves 5 for leading oil on the sliding surface 6 and for maintaining a continuous oil film between the sliding surface 6 and the opposing inner surface 7 of the roll shell 2. Since the present invention is not limited to any special bearing structure, or not even to slide bearings, and since the structure and operation of slide bearings is well known in the art, the bearings are not described here in further detail.

The end of the roll shell 2 is closed by an end plate 8 attached on the end of the shell 2 and having a flange 9 extending towards the axle 1 of the roll. The end plate 8 has a hole, and the axle 1 of the roll runs through this hole. The edges 10 of the hole form a gap with the surface of the axle 1 allowing the axle 1 to move freely in the hole. The end of the shell is sealed by a piston ring seal 11 and a sliding disc seal 14. The ring seal 11 is mounted by spring loaded pistons 13 on a mounting ring 12 that in turn is mounted on the axle 1. The sealing surface of the slide ring seal 11 is pressed against the inner surface of the flange 9 of the end plate 8 and forms the first seal for the oil space on the slide bearing 3.

The second seal is provided by a sliding disc seal 14. This seal comprises a ring-shaped disc 15 having an outer edge and an inner edge. The outer edge of the disc 15 is fitted in a ring-shaped chamber 18 formed on the flange 9 of the end plate 8 by a retainer ring 17 and extending radially outwards from the center axis of the roll. The outer diameter of the disc 15 is smaller than the inner diameter of the chamber 18 whereby the disc 15 can move radially within the chamber 18.

The inner edge of the disc 15 is provided with a lip seal 16. The diameter of the lip seal 16 is chosen so that it fits on the axle 1 at the mounting point of the seal 14. The surface of the axle 1 is machined straight in axial direction of the axle to form a sliding surface for the lip seal 16 on the axle 1. Thus the axle 1 and the seal 14 may move axially in relation to each other without loosing the sealing contact between the lip seal 16 and the surface of the axle 1. The inner diameter of the disc 15 is chosen so that the lip seal 16 attached on the inner edge of the disc 16 is pressed on the surface of the axle 1 by a predetermined force. Each lip seal requires a predetermined space between a mounting surface and a contacting surface in order to function properly. This space requirement is set forth in the manuals of the seal manufacturers. In the above-described structure the space required by the seal is the gap between the inner edge of the disc 15 and the outer surface of the axle 1. This gap can be readily calculated according to the specifications given to a specific seal type that is used. Since the lip seal 16 and the seal disc 15 closely surround the axle, they move together with the axle and a good sealing contact is maintained constantly. The lip seal 16 is also pressed constantly by same optimum force on the sliding surface whereby the wear of the seal is minimized and the seal wears evenly over its circumference.

In FIG. 2 is shown a seal structure wherein the chamber 18 of the seal disc 15 is mounted on the axle 1. The chamber 18 comprises a mounting ring 19 fitted on the axle 1. The chamber 18 is in the side of the mounting ring 19 facing towards the oil chamber of the slide bearing 3. As in the above described embodiment, the chamber is closed by a retainer ring 17. The inner edge 10 of the flange 9 of the end plate 8 forms the sliding surface for the lip seal 16, and, in this embodiment, the lip seal is mounted on the outer edge of the disc 15. The portion of the embodiment within box A of FIG. 2 is shown in detail in FIG. 3.

Figure 3:
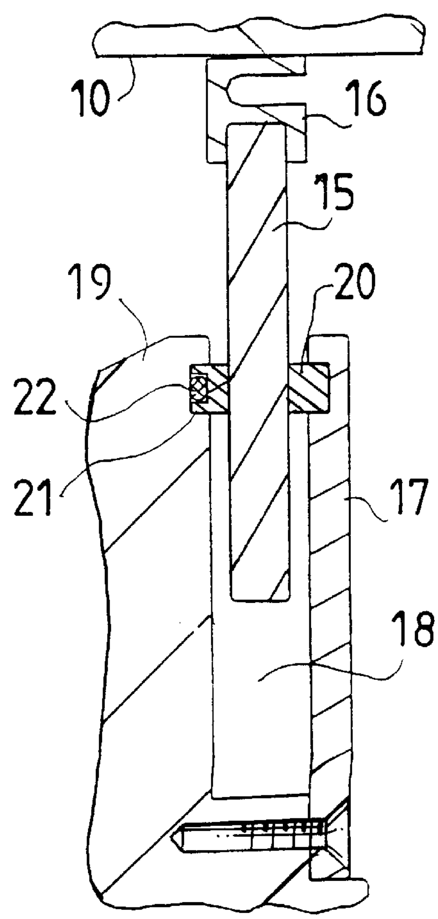
FIG. 3 shows a detailed sectional view of the box A of FIG. 2.

Referring now to FIG. 3, the seal disc 15 is placed between two guide rings 20, 21 which also may act as seals. One of the guide rings is fitted in a groove in the retainer ring 17 and the other guide ring 21 is fitted in a groove on the mounting ring 19, and together they hold the seal disc 15 slidingly between them so that the disc 15 can move in chamber 18. The groove on the mounting ring 19 is sealed with an O-ring 22 to prevent leaking of oil from the chamber 18. From FIG. 3 it can be seen that the lip seal 16 may be any standard seal that is suitable for a chemical and mechanical stress environment in question and is designed to be mounted on a protruding edge.

Figure 4:
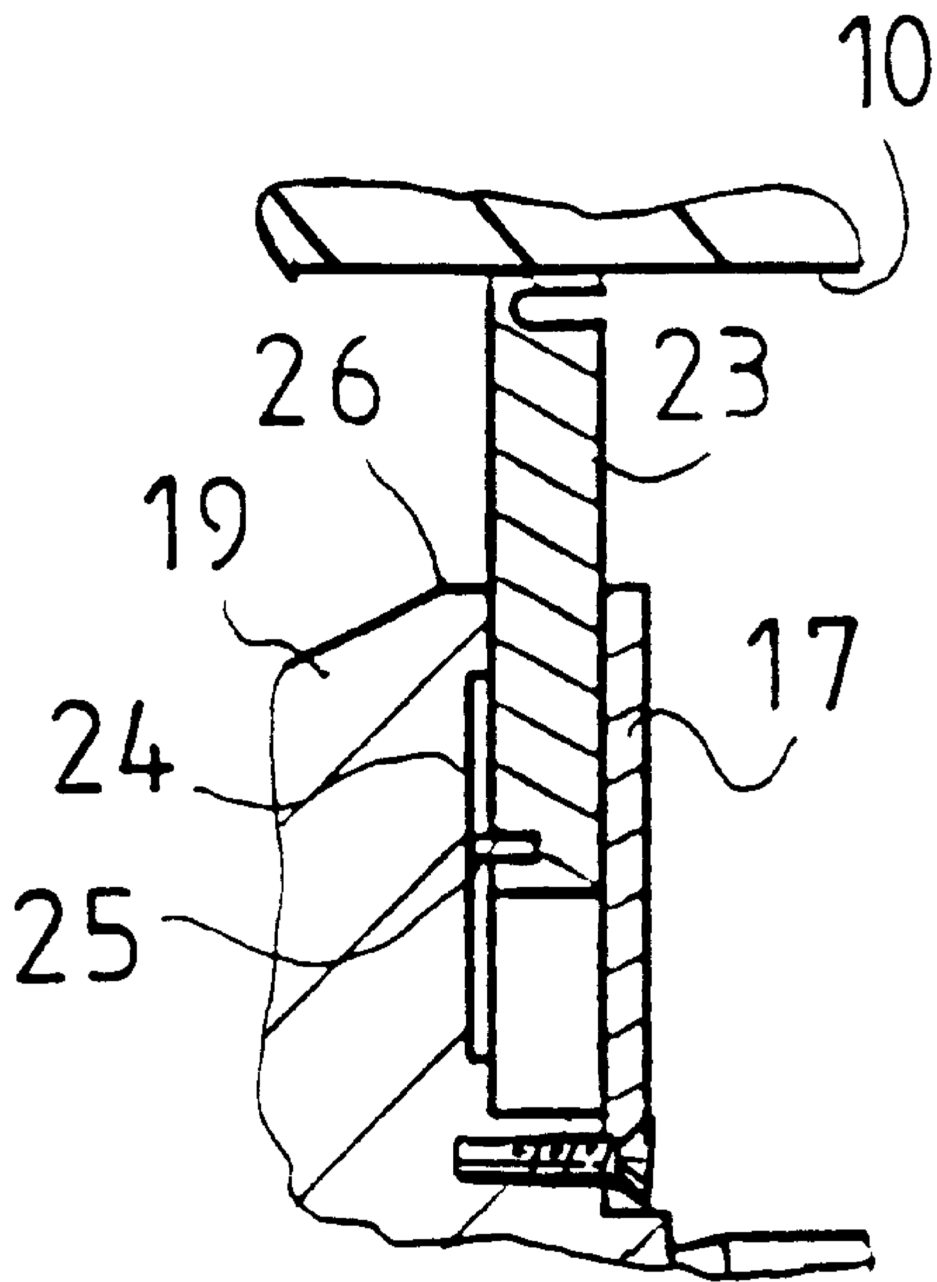
FIG. 4 shows a sectional view of a further embodiment of the present invention.

FIG. 4 shows a further embodiment of the present invention. In this embodiment the seal ring 23 is made of same material as the lip seal and they form an integral component. The mounting ring 19 is formed so that its edge 26 forms the outer guide ring and the retainer ring 17 supports the other side of the seal ring 23. It is often desirable to prevent the rotative movement of the seal disk 15 in the chamber 18. In this embodiment the seal disk 23 is locked in the chamber by a pin 25 attached to the seal disk 23. In the mounting ring 19 is a slot 24, and the pin 25 may slide in the slot 24 in order to make possible the radial movement of the seal disk 23.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A sliding seal for an end of a roll used in a paper or board making machine or a finishing apparatus, the roll having an axle and a shell mounted about the axle to be rotatable thereabout, the shell having an end flange fixedly mounted to an end of the shell, the sliding seal comprising:

a chamber extending around an end of the axle and extending radially from an axis of the axle, the chamber having an aperture along an edge of the chamber;

a ring-shaped sliding seal disc slidingly mounted within the chamber so that an edge of the seal disk extends out of the aperture of the chamber; and a ring-shaped lip seal fixedly mounted to the edge of the seal disc extending out of the aperture of the chamber;

wherein one of (a) the chamber is mounted to the flange and the lip seal presses against the axle to form a fluid tight seal with the axle, and (b) the chamber is mounted to the axle and the lip seal is pressed against the flange to form a fluid tight seal with the flange.

2. The seal of claim 1, wherein the chamber is mounted to the flange and the lip seal presses against the axle to form a fluid tight seal with the axle.

3. The seal of claim 1, wherein the chamber is mounted to the axle and the lip seal is pressed against the flange to form a fluid tight seal with the flange.

4. The seal of claim 3, further comprising a mounting ring mounted onto the axle, the chamber being formed in the mounting ring.

5. The seal of claim 1, wherein the lip seal is detachable from the seal disc.

6. The seal of claim 1, wherein the lip seal is an integral part of the seal disc.

7. The seal of claim 1, further comprising means for preventing rotative movement of the seal disc within the chamber.

8. The seal of claim 7, wherein the means for preventing rotative movement comprises a pin mounted to the seal ring, and wherein the chamber has a slot into which the pin is slidably mounted.

9. A roll used in a paper or board making machine or a finishing apparatus, the roll having a sliding seal, comprising:

a roll having an axle and a shell mounted about the axle to be rotatable thereabout, the shell having an end flange fixedly mounted to an end of the shell; and a sliding seal comprising:

a chamber extending around an end of the axle and extending radially from an axis of the axle, the chamber having an aperture along an edge of the chamber;

a ring-shaped sliding seal disc slidingly mounted within the chamber so that an edge of the seal disk extends out of the aperture of the chamber; and a ring-shaped lip seal fixedly mounted to the edge of the seal disc extending out of the aperture of the chamber;

wherein one of (a) the chamber is mounted to the flange and the lip seal presses against the axle to form a fluid tight seal with the axle, and (b) the chamber is mounted to the axle and the lip seal is pressed against the flange to form a fluid tight seal with the flange.

10. The roll of claim 9, wherein the chamber is mounted to the flange and the lip seal presses against the axle to form a fluid tight seal with the axle.

11. The roll of claim 9, wherein the chamber is mounted to the axle and the lip seal is pressed against the flange to form a fluid tight seal with the flange.

12. The roll of claim 11, further comprising a mounting ring mounted onto the axle, the chamber being formed in the mounting ring.

13. The roll of claim 9, wherein the lip seal is detachable from the seal disc.

14. The roll of claim 9, wherein the lip seal is an integral part of the seal disc.

15. The roll of claim 9, further comprising means for preventing rotative movement of the seal disc within the chamber.

16. The roll of claim 15, wherein the means for preventing rotative movement comprises a pin mounted to the seal ring, and wherein the chamber has a slot into which the pin is slidably mounted.

* * * * *